United States Patent [19]

Kobayashi

[11] Patent Number: 4,729,975

[45] Date of Patent: Mar. 8, 1988

[54] METHOD FOR REGENERATING A DENITRATION CATALYST FOR EXHAUST GASES FROM COAL-BURNING APPARATUS

[75] Inventor: Norihisa Kobayashi, Nagasaki, Japan

[73] Assignee: Mitsubishi Jukogyo Kabushiki Kaisha, Tokyo, Japan

[21] Appl. No.: 862,652

[22] Filed: May 13, 1986

[30] Foreign Application Priority Data

May 17, 1985 [JP] Japan .................................. 60-103995

[51] Int. Cl.$^4$ ........................ B01J 38/00; B01J 38/72; B01D 53/36
[52] U.S. Cl. ..................... 502/20; 423/239; 502/21; 502/515; 502/527
[58] Field of Search ............................ 502/20, 21, 515; 423/239

[56] References Cited

U.S. PATENT DOCUMENTS 4,572,903  2/1986  Himo et al. ........................... 502/21

FOREIGN PATENT DOCUMENTS 1097417  1/1961  Fed. Rep. of Germany ........ 502/21
27596  3/1964  German Democratic Rep. ... 502/21
146447  9/1983  Japan ..................................... 502/20
865490  4/1961  United Kingdom .................. 502/20

Primary Examiner—Paul E. Konopka
Attorney, Agent, or Firm—Holman & Stern

[57] ABSTRACT

A method for regenerating a denitration catalyst for exhaust gases discharged from coal-burning apparatus, in which a used catalyst whose denitration performance has lowered is contacted with fluidized abrasive particles. As a result, catalyst poisons deposited on the catalyst surface are removed by abrasive contact.

5 Claims, 6 Drawing Figures

METHOD FOR REGENERATING A DENITRATION CATALYST FOR EXHAUST GASES FROM COAL-BURNING APPARATUS

FIELD OF THE INVENTION AND RELATED ART STATEMENT

This invention relates to a regeneration method of a catalyst and more particularly, to a method for regenerating a denitration catalyst for exhaust gases from coal-burning apparatus in which a catalyst pack or packs can be regenerated, as they are, in a denitration reactor and thus, the method is conveniently economical and simple.

In recent years, there have been used dry denitration apparatus of flue gases for the purpose of environmental protection in which nitrogen oxides in exhaust gases discharged from various combustion apparatus are removed by catalytic reduction in the presence of ammonia. The dry apparatus have a number of advantages over wet denitration apparatus. This is the reason why such apparatus have often been employed in recent years. Of the known dry apparatus, denitration apparatus using nitrogen oxide-removing catalysts in the form of a honeycomb, lattice or plate have a number of advantages that the construction is simple, a pressure loss is small and clogging of the catalyst with dust in exhaust gases is rarely experienced. Accordingly, these types of apparatus have predominantly been in use.

However, it is known that the catalysts used for the denitration are disadvantageous in that their activity gradually lowers over a long term of use because an active component of the catalyst reacts or is coated with components of dust in exhaust gases and particularly, with catalyst poisons such as alkali metals. In particular, with exhaust gases from coal-burning boilers, calcium components, such as CaO, $CaSO_4$ and the like, contained in the exhaust gas form a coating on the catalyst surface, thus causing the life of the catalyst to lower.

OBJECTS AND SUMMARY OF THE INVENTION

An object of the present invention is to provide a method for regenerating a denitration catalyst of an exhaust gas from a coal-burning boiler.

Another object of the invention is to provide a method for regenerating a denitration catalyst of the above type in which calcium components such as CaO, $CaSO_4$ and the like formed on the surface of the catalyst can be efficiently removed, so that the catalyst is regenerated with a prolonged life of the catalyst.

According to the invention, there is provided a method for regenerating a coal-burning denitration catalyst which comprises contacting fluidized abrasive particles with a catalyst whose catalytic activity has lowered, so that a catalyst poison deposited on the catalyst surface is removed with the abrasive particles.

With exhaust gases from coal-burning boilers, calcium components, such as CaO, $CaSO_4$ and the like, contained in the exhaust gas are uniformly deposited on the catalyst surface in a very thin layer, thus causing the catalytic performance to lower. The calcium components deposited as the very thin surface layer are contacted with abrasive particles, such as alumina, which are fluidized, with the result that they are removed to restore the catalytic performance.

DETAILED DESCRIPTION AND EMBODIMENTS OF THE INVENTION

The abrasive particles are those of alumina, silica, silica-alumina [$(SiO_2)_n (Al_2O_3)_n$], titanium oxide and the like. These abrasives may be used singly or in combination. If the abrasive particles are too fine, it takes a very long time before completion of an abrasion operation. In this sense, the particle size should preferably be not smaller than 100 microns although smaller sizes may be used.

The denitration catalyst is generally used as a pack in which several hundred pieces, blocks or plates of the catalyst are placed. The fluidized abrasion method of the invention may be carried out using one piece or plate of the catalyst, but the method using one catalyst pack is described below.

Figure 1:
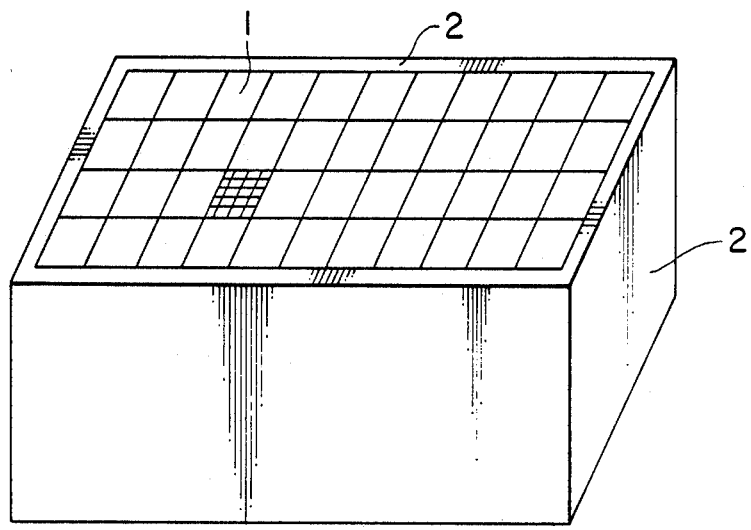
FIG. 1 is a schematic perspective view of one example of a catalyst pack to which the method of the invention can be applied.

As is particularly shown in FIG. 1, several hundred blocks or plates of a catalyst 1 are suitably arranged in a frame 2 to form a catalyst pack 3.

Figure 2:
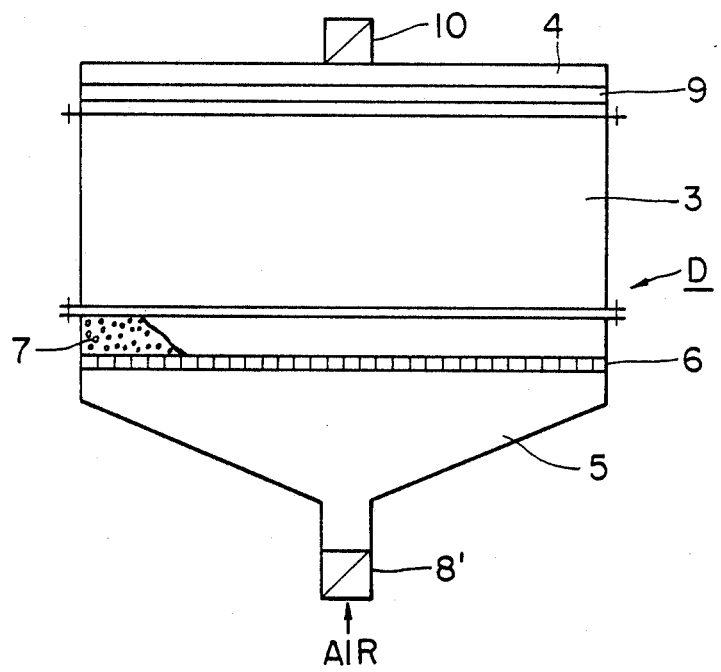
FIG. 2 is a schematic view of an apparatus for carrying out the method of the invention.

The fluidized abrasion method of the invention is carried out, for example, by a manner as shown in FIG. 2. In the figure, indicated by 3 is the catalyst pack, by 4 is an upper cover 4, by 5 is a hopper provided at a lower portion of a denitration apparatus, by 6 is a grating, by 7 are fluidized abrasive particles, by 8 is an air inlet valve for fluidizing the abrasive particles, by 9 is a filter for the abrasive particles, and by 10 is an outlet for air.

Figure 3:
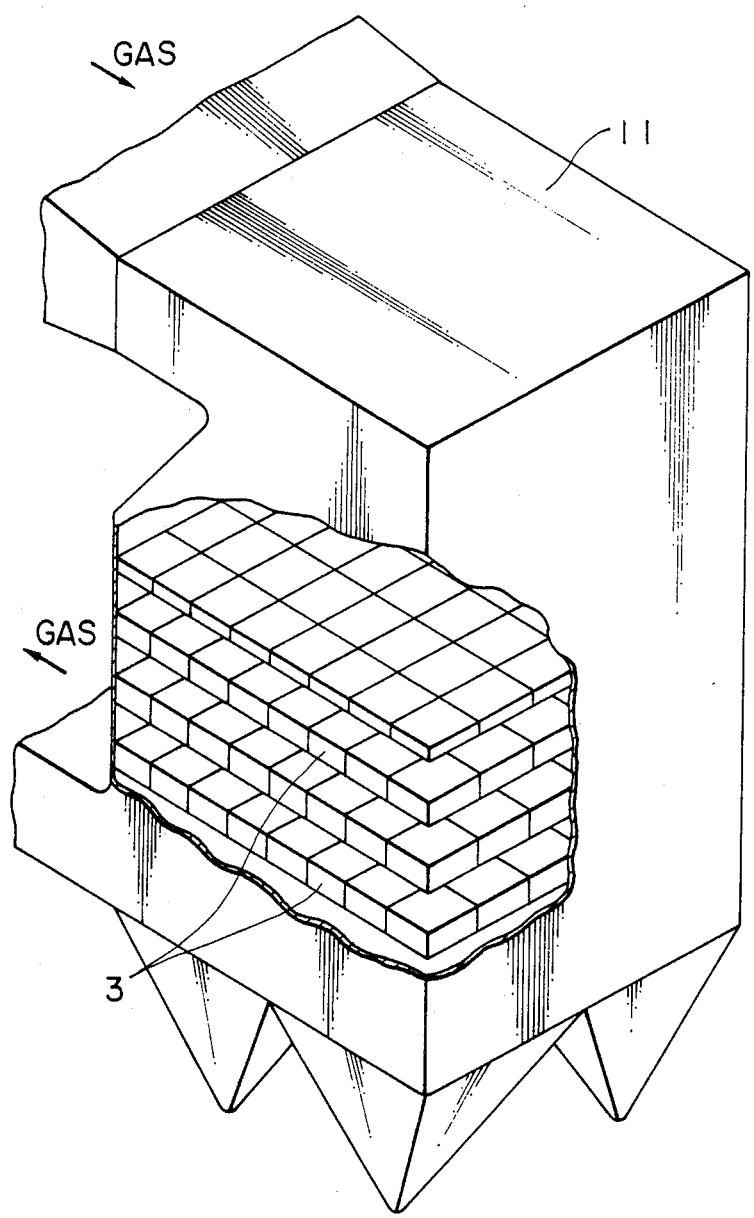
FIG. 3 is a schematic view, partially cut away, of a reactor provided with a catalyst pack.

The catalyst packs 3 are placed in a reactor 11 as shown, for example, in FIG. 3, so that leakage of a flowing gas can be completely prevented. Thus, the denitration apparatus D which is provided with the upper cover 4 and the lower hopper 5 is of a completely closed system. The abrasive particles 7 such as alumina, silica or the like are charged into the catalyst pack at the lower portion thereof as particularly shown in FIG. 2. Since the grating 6 is provided at the lower hopper 5, air which is introduced under pressure from the air inlet valve 8 particles forces the abrasive particles 7 to be fluidized.

In ordinary fluidized beds, a certain space is established at an upper portion of the apparatus in order to prevent scattering of a fluidized material. In the practice of the invention, however, the space is reduced to an extent as small as possible. For this purpose, air and the fluidized abrasive particles 7 are separated by means of the filter 9 in which alumina grains are filled, so that air alone is discharged from the air outlet valve 10.

The abrasive particles 7 such as alumina, silica or the like are so fluidized in the catalyst pack that the catalyst is abraded on the outer surface thereof. As a consequence, CaO and $CaSO_4$ deposited on the surface can be removed, thus permitting the catalyst to be regenerated.

When the method of the invention is applied to the catalyst packs 3 in the reactor 11 of FIG. 3, the respective packs may be successively regenerated one by one.

EXAMPLE

Figure 4:
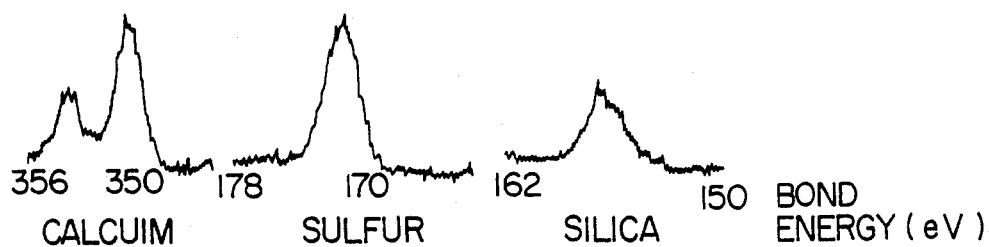
FIGS. 4 and 5 are, respectively, electron spectrograms prior to and after regeneration of a used catalyst according to the method of the invention.

A catalyst used for two years for denitration of an exhaust gas from a coal-burning boiler (as shown in FIG. 1) was subjected to measurement of energy changes according to the electron spectroscopy for chemical analysis prior to and after application of the method of the invention. The results are shown in FIG. 4 (prior to the application) and FIG. 5 (after the application).

The method of the invention were performed under the following conditions by the use of the apparatus shown in FIG. 2.

Abrasive particles: silica-alumina (particle size 1 mm)

Fluidizing conditions: fluidizing rate 1 m/second to 1.5 m/second.

Abrasion (fluidizing) time: 1 hour

Figure 5:
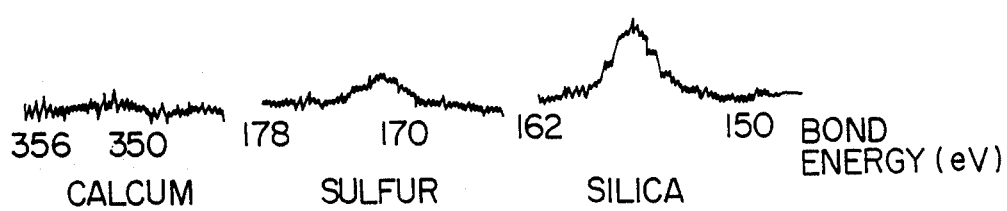

As will be seen from FIGS. 4 and 5, calcium components which have been deposited on the catalyst surface prior to application of the method of the invention are scarcely found.

Figure 6:
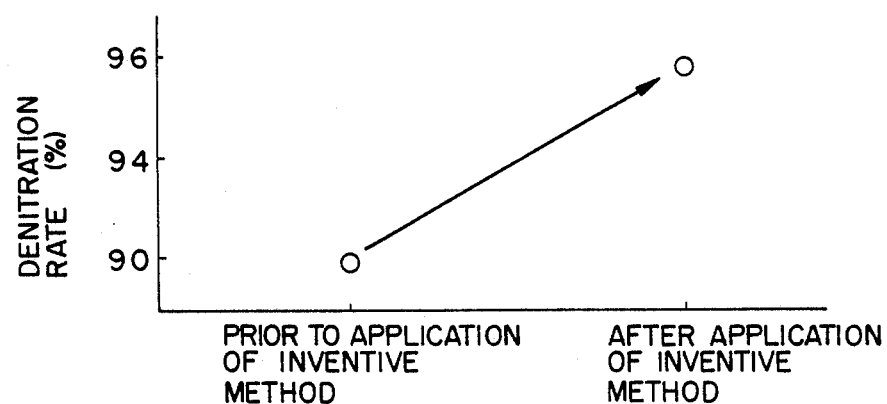
FIG. 6 is a graphical representation of a denitration rate prior to and after regeneration of a used catalyst.

FIG. 6 shows denitration rates prior to and after application of the method of the invention. The denitration rate was determined using SV value=[amount of treating gas $(Nm^3/hr)$]/[amount of catalyst $(m^3)$=4000 1/hr and a molar ratio of $NH_3/NOx$ in the gas = [$NH_3$ at inlet (ppm)]/[$NO_x$ at inlet (ppm)] = 1.0.

As will be seen from FIG. 6, the denitration performance increases when the catalyst is treated according to the method of the invention.

What is claimed is:

1. A method for regenerating a denitration catalyst for exhaust gases from a coal-burning apparatus which comprises arranging in a closed system a grating on which catalyst pack is disposed, putting abrasive particles inside said grating, feeding air so as to fluidize said abrasive particles in said closed system and then contacting the catalyst, whose denitration performance has lowered, with said fluidized abrasive particles to remove poisons deposited on the surface on the catalyst to regenerate the catalyst.

2. The method according to claim 1, wherein said abrasive particles are particles of a member selected from the group consisting of alumina, silica, silica-alumina, titanium oxide and mixtures thereof.

3. The method according to claim 1, wherein said abrasive particles has a size not smaller than 100 microns.

4. The method according to claim 1, wherein said abrasive particles are fluidized at a rate of 1 m/second to 1.5 m/second.

5. The method of claim 1 wherein the denitration catalyst is in the form of a pack in a reactor.

* * * * *